United States Patent Office 3,092,541
Patented June 4, 1963

3,092,541
NEW CARBAMOYLALKYL PHOSPHORUS ESTER COMPOUNDS
Ernst Beriger, Allschwil, Switzerland, assignor to Ciba Limited, Basel, Switzerland, a company of Switzerland
No Drawing. Filed Feb. 21, 1961, Ser. No. 90,636
Claims priority, application Switzerland Feb. 24, 1960
17 Claims. (Cl. 167—22)

This invention provides organic phosphorus compounds of the general formula

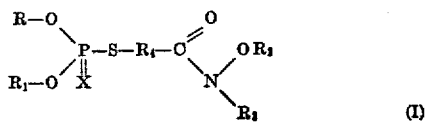
(I)

in which R and $R_1$ each represent an alkyl, cycloalkyl, aralkyl, aryl or heterocyclic radical which may be substituted, and which alkyl radical may be interrupted by at least one oxygen atom, $R_2$ represents a hydrogen atom or a lower alkyl or lower acyl radical, $R_3$ represents a hydrogen atom or a lower alkyl radical, $R_4$ represents the radical —$CH_2$—, —$CH_2$—$CH_2$— or

in which $R_5$ represents a lower alkyl radical, and X represents an oxygen or sulfur atom.

The above compounds are new and are valuable agents for combating pests, especially harmful insects and acarids. They are active against the various stages of development, such as eggs, larvae and imagines, and they are both contact poisons and stomach poisons.

The invention also provides a process for the manufacture of the compounds of the above Formula I, wherein a compound of the formula

(II)

in which R, $R_1$ and X have the meanings given above, and Me represents a cation, more especially an alkali metal ion, is reacted with a compound of the formula

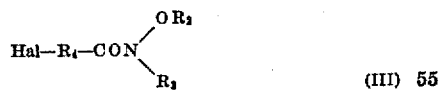
(III)

in which $R_2$, $R_3$ and $R_4$ have the meanings given above, and Hal represents a halogen atom, for example, bromine or chlorine.

The compounds of the general Formula II are advantageously dialkyl esters of dithio phosphoric acid or of thiolphosphoric acid, of which the alkyl radical contain 1 to 4 carbon atoms, and also alkali metal salts of these esters.

The compounds of the general Formula (III) are hydroxylamides, for example, O:N-dialkyl-hydroxylamides, of lower monohalogenated monocarboxylic acids.

The reaction components are reacted at the ordinary or a raised temperature, for example, at a temperature within the range of 0° to 120° C., and advantageously 10° C. to 90° C. It may be of advantage or convenient to work in an inert solvent, such as an alcohol or a ketone, for example, acetone or methanol or to add water and, if desired, to work in an atmosphere of an inert gas, for example, under nitrogen, and/or under reduced pressure.

It may also be of advantage to react the aforesaid starting materials with the aid of heat in a two-phase system which consists, for example, of water and an organic solvent, for example, methylene chloride, the relative proportions of the aqueous or organic phase varying within relatively wide limits.

As stated above, the compounds of the invention are valuable agents for combating pests, especially insects and acarids.

Accordingly, the invention also provides pest combating preparations which comprise an active substance of the above Formula I in admixture with a liquid or solid diluent.

A very wide variety of materials or objects can be protected against pests, including harmful insects and acarids, and a gaseous or liquid or solid substance may be used as a carrier for the active substance. As such substances to be protected or to be used as carriers there may be mentioned, for example, air, especially in rooms, and liquids, for example, water in ponds and finally any dead or living solid substratum, for example, objects in living rooms, cellars, attics or stables, and also pelts, feathers, wool or the like, and also living organisms of the vegetable or animal kingdom in their very wide variety of stages of development, provided that they are not sensitive to the pest combating agents.

The combating of pests is carried out by the usual methods, for example, by treating the material or object to be protected with the active compound in the form of vapour, for example, as a fumigant, or in the form of a dusting or spraying preparation, for example, as a solution or suspension, which may be prepared with water or an organic solvent, for example, alcohol, petroleum, a tar distillate or the like. The preparations may also be in the form of aqueous solutions or aqueous emulsions of organic solvents which contain active substances, and which emulsions or solutions can be applied to the objects or materials to be protected by brushing, spraying or dipping.

The spraying or dusting preparations may contain the usual inert fillers or marking agents, for example, kaolin, gypsum or bentonite, or other additions such as sulfite cellulose waste liquor, cellulose derivatives or the like, and they may also contain the usual wetting agents or adherent agents for improving the wetting capacity or adherent property of the preparations. The pest combating preparations may be made up in powder form, in the form of aqueous dispersions or pastes, or in the form of self-dispersing oils.

A compound of the Formula I may be the sole active substance present in the preparation or it may be present in combination with another insecticide and/or fungicide.

Such preparations are used for plant protection by the usual spraying, pouring, dusting or fumigating methods.

The following examples illustrate the invention, the parts and percentages being by weight unless otherwise stated, and the relationship of parts by weight to parts by volume being the same as that of the kilogram to the liter.

EXAMPLE 1

A solution of 19.8 parts of the sodium salt of dimethyldithiophosphoric acid in 40 parts by volume of acetone is treated within 5 minutes dropwise with a solution of 13.75 parts of chloroacetic acid-O:N-dimethylhydroxylamide (melting at 41° C.) in 20 parts by volume of acetone. The reaction is slightly exothermic. The mixture is stirred for one hour at room temperature and then for 2 hours at 40 to 45° C., the precipitated sodium chloride is filtered off and the filtrate is evaporated in vacuo at 40° C. The residue is taken up in 50 parts by volume of methylene chloride and washed with 10 parts by volume of water and then with 2×10 parts by volume of sodium bicarbonate solution. The solution is dried over sodium sulfate and evaporated in vacuo, to yield as residue 20.55 parts of a compound of the formula

*Analysis.*—Calculated: P, 11.95%. Found: P, 11.8%.

EXAMPLE 2

As described in Example 1, 22.9 parts of the sodium salt of diethyldithiophosphoric acid are reacted with 13.75 parts of chloroacetic acid-O:N-dimethylhydroxylamide, to yield 23.5 parts of a compound of the formula

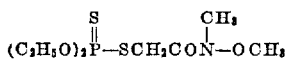

*Analysis.*—Calculated: P, 10.78%. Found: P, 10.6%.

EXAMPLE 3

As described in Example 1, 9.9 parts of the sodium salt of dimethyldithiophosphoric acid are reacted with 8.25 parts of chloroacetic acid-O-methyl-N-isopropylhydroxylamide (boiling at 55 to 59° C. under a pressure of 0.08 mm. Hg), to yield 9.7 parts of a compound of the formula

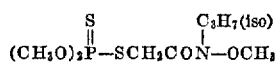

*Analysis.*—Calculated: P, 10.78%. Found: P, 11.2%.

EXAMPLE 4

(a) As described in Example 1, 10.05 parts of the sodium salt of diethyldithiophosphoric acid are reacted with 7.25 parts of chloroacetic acid-O-methyl-N-isopropylhydroxylamide, to yield 9.9 parts of a compound of the formula

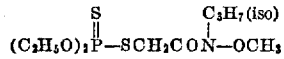

*Analysis.*—Calculated: P, 9.82%. Found: P, 9.8%.

(b) As described in Example 1, 10.95 parts of chloroacetohydroxamic acid in 25 parts by volume of acetone are reacted with 19.8 parts of the sodium salt of dimethyldithiophosphoric acid by being stirred for 20 hours at room temperature. There are obtained 15 parts of a compound of the formula

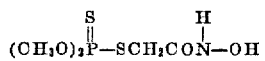

*Analysis.*—Calculated: P, 13.40%. Found: P, 13.41%.

EXAMPLE 5

22.4 parts of the sodium salt of dimethyldithiophosphoric acid are stirred with a solution of 12.8 parts of chloroacetic acid-N-methoxyamide (melting at 41° C.) in 45 parts by volume of water. The temperature is maintained for 7 hours at 10 to 15° C., whereupon the mixture is stirred for another 24 hours at room temperature. The oil is isolated and the aqueous solution is washed with 50 parts by volume of benzene. The benzene solution is combined with the oil, washed with a small amount of sodium bicarbonate solution and dried over sodium sulfate. The benzene is evaporated in vacuo at a bath temperature of 40 to 50° C., to yield as residue 16.4 parts of a crystalline compound of the formula

melting at 47 to 48° C.

*Analysis.*—Calculated: P, 12.63%. Found: P, 13.0%.

EXAMPLE 6

As described in Example 5, 23.8 parts of the sodium salt of diethyldithiophosphoric acid are reacted with 11.8 parts of chloroacetic acid-N-methoxyamide, to yield 22.8 parts of a compound of the formula

*Analysis.*—Calculated: P, 11.34%. Found: P, 11.4%.

EXAMPLE 7

As described in Example 5, 19.4 parts of the sodium salt of dimethyldithiophosphoric acid are reacted with 11.2 parts of chloroacetic acid-N-methylhydroxylamine (melting at 70 to 71° C.), to yield 18.8 parts of a crystalline compound of the formula

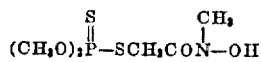

which on recrystallization from benzene forms white needles melting at 67° C.

*Analysis.*—Calculated: P, 12.63%. Found: P, 12.7%.

EXAMPLE 8

(a) A solution of 12.35 parts of chloroacetic acid-N-methylhydroxylamide and 22.9 parts of the sodium salt of diethyldithiophosphoric acid in 30 parts by volume of water is heated to 30° C. The heating is then discontinued and the mixture is stirred overnight at room temperature. The oil which forms is separated from water. The water is washed with 50 parts by volume of methylene chloride, the oil is combined with the methylene chloride extract and the whole is agitated with 10 parts by volume of saturated sodium bicarbonate solution. The solution is dried over sodium sulfate and evaporated in vacuo at 40 to 50° C., to yield as residue 24.8 parts of a compound of the formula

*Analysis.*—Calculated: P, 11.33%. Found: P, 11.28%.

(b) When the salts of the esters of dithiophosphoric acid are reacted as described above with the hydroxylamides shown in the following Table I, the compounds 1 to 12 of the Table I are obtained:

Table I

| Comp. No. | Ester of dithiophosphoric acid | Hydroxylamide | Formula of final product | Analysis |
|---|---|---|---|---|
| 1 | $(CH_3O)_2\overset{S}{\overset{\|}{P}}-S-Na$ | $ClCH_2-CO-N\overset{C_2H_5}{\underset{OH}{<}}$ | $(CH_3O)_2\overset{S}{\overset{\|}{P}}-SCH_2-CON\overset{C_2H_5}{\underset{OH}{<}}$ | P calc.: 11.95%. P found: 11.7%. |
| 2 | $(C_2H_5O)_2\overset{S}{\overset{\|}{P}}-S-Na$ | $ClCH_2-CO-N\overset{C_2H_5}{\underset{OH}{<}}$ | $(C_2H_5O)_2\overset{S}{\overset{\|}{P}}-S-CH_2-CON\overset{C_2H_5}{\underset{OH}{<}}$ | P calc.: 10.78%. P found: 10.2%. |
| 3 | $(CH_3O)_2\overset{S}{\overset{\|}{P}}-S-Na$ | $ClCH_2-CO-N\overset{C_2H_5}{\underset{OC_2H_5}{<}}$ | $(CH_3O)_2\overset{S}{\overset{\|}{P}}-S-CH_2-CON\overset{C_2H_5}{\underset{OC_2H_5}{<}}$ | P calc.: 10.78%. P found: 10.2%. |
| 4 | $(C_2H_5O)_2\overset{S}{\overset{\|}{P}}-S-Na$ | $ClCH_2-CO-N\overset{C_2H_5}{\underset{OC_2H_5}{<}}$ | $(C_2H_5O)_2\overset{S}{\overset{\|}{P}}-S-CH_2-CON\overset{C_2H_5}{\underset{OC_2H_5}{<}}$ | P calc.: 9.82%. P found: 9.89%. |
| 5 | $(CH_3O)_2\overset{S}{\overset{\|}{P}}-S-Na$ | $Br-CH_2CH_2-CO-N\overset{CH_3}{\underset{OCH_3}{<}}$ | $(CH_3O)_2\overset{S}{\overset{\|}{P}}-S-CH_2-CH_2-CO-N\overset{CH_3}{\underset{OCH_3}{<}}$ | P calc.: 11.33%. P found: 10.23%. |
| 6 | $(CH_3O)_2\overset{S}{\overset{\|}{P}}-S-Na$ | $Br-\underset{CH_3}{\overset{\|}{C}H}-CO-N\overset{CH_3}{\underset{OCH_3}{<}}$ | $(CH_3O)_2\overset{S}{\overset{\|}{P}}-S-\underset{CH_3}{\overset{\|}{C}H}-CO-N\overset{CH_3}{\underset{OCH_3}{<}}$ | P calc.: 11.33%. P found: 10.57%. |
| 7 | $(C_2H_5O)_2\overset{S}{\overset{\|}{P}}-S-Na$ | $Br-\underset{CH_3}{\overset{\|}{C}H}-CO-N\overset{CH_3}{\underset{OCH_3}{<}}$ | $(C_2H_5O)_2\overset{S}{\overset{\|}{P}}-S-\underset{CH_3}{\overset{\|}{C}H}-CON\overset{CH_3}{\underset{OCH_3}{<}}$ | P calc.: 10.28%. P found: 9.3%. |
| 8 | $(CH_3O)_2\overset{S}{\overset{\|}{P}}-S-Na$ | $Cl-CH_2-CO-N\overset{C_3H_7}{\underset{OH}{<}}$ | $(CH_3O)_2\overset{S}{\overset{\|}{P}}-S-CH_2-CO-N\overset{C_3H_7}{\underset{OH}{<}}$ | P calc.: 11.33%. P found: 10.22. |
| 9 | $(C_2H_5O)_2\overset{S}{\overset{\|}{P}}-S-Na$ | $Cl-CH_2-CO-N\overset{C_3H_7(Iso)}{\underset{OH}{<}}$ | $(C_2H_5O)_2\overset{S}{\overset{\|}{P}}-S-CH_2-CO-N\overset{C_3H_7(Iso)}{\underset{OH}{<}}$ | P calc.: 10.28%. P found: 9.8%. |
| 10 | $\underset{(CH_3)_2CHO}{\overset{CH_3O}{>}}\overset{S}{\overset{\|}{P}}-S-K$ | $Cl-CH_2-CO-N\overset{CH_3}{\underset{OCH_3}{<}}$ | $\underset{(CH_3)_2CHO}{\overset{CH_3O}{>}}\overset{S}{\overset{\|}{P}}-S-CH_2-CO-N\overset{CH_3}{\underset{OCH_3}{<}}$ | P calc.: 10.78%. P found: 9.8%. |
| 11 | 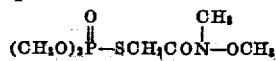 | $Cl-CH_2-CO-N\overset{CH_3}{\underset{OCH_3}{<}}$ | 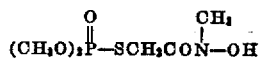 | P calc.: 9.46%. P found: 8.9%. |
| 12 | 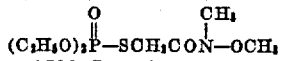 | $Cl-CH_2-CO-N\overset{CH_3}{\underset{OH}{<}}$ | 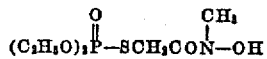 | P calc.: 11.33%. P found: 11.08%. |

EXAMPLE 9

(a) A solution of 39.8 parts of the potassium salt of dimethylthiolphosphoric acid and 27.5 parts of chloroacetic acid-O:N-dimethylhydroxylamide in 60 parts by volume of acetone is heated for 8 hours at 40 to 50° C. After working up as described in Example 1, followed by distillation in a high vacuum, there are obtained 25.2 parts of the compound of the formula $$(CH_3O)_2\overset{O}{\overset{\|}{P}}-SCH_2CO\underset{\underset{OCH_3}{\|}}{N}-\overset{CH_3}{}$$

boiling at 131 to 135° C. under 0.12 mm. Hg pressure.
Analysis.—Calculated: S, 13.18%. Found: S, 13.0%.

(b) A solution of 22.89 parts of the potassium salt of diethylthiolphosphoric acid and 13.75 parts of chloroacetic acid-O:N-dimethylhydroxylamide in 30 parts by volume of acetone is heated for 8 hours at 40 to 50° C. Working up as described in Example 1 yields 14.4 parts of the compound of the formula $$(C_2H_5O)_2\overset{O}{\overset{\|}{P}}-SCH_2CO\underset{\underset{OCH_3}{\|}}{N}-\overset{CH_3}{}$$

boiling at 155 to 159° C. under 0.2 mm. Hg pressure.

Analysis.—Calculated: P, 10.94%. Found: P, 11.02%.

(c) A solution of 19.8 parts of the potassium salt of dimethylthiolphosphoric acid and 12.35 parts of chloroacetic acid-N-methylhydroxylamide in 30 parts by volume of acetone is heated for 18 hours at 40 to 50° C. Working up as described in Example 1 yields 6.3 parts of the compound of the formula $$(CH_3O)_2\overset{O}{\overset{\|}{P}}-SCH_2CO\underset{\underset{OH}{\|}}{N}-\overset{CH_3}{}$$

Analysis.—Calculated: P, 13.52%. Found: P, 13.4%.

(d) A mixture of 22.9 parts of the potassium salt of diethylthiolphosphoric acid and 12.35 parts of chloroacetic acid-N-methylhydroxylamide in 30 parts by volume of acetone is heated for 18 hours at 40 to 50° C. Working up as described in Example 1 yields 17.1 parts of a compound of the formula $$(C_2H_5O)_2\overset{O}{\overset{\|}{P}}-SCH_2CO\underset{\underset{OH}{\|}}{N}-\overset{CH_3}{}$$

Analysis.—Calculated: P, 12.04%. Found: P, 12.0%.

EXAMPLE 10

(a) As described in Example 8, 16.55 parts of chloroacetic acid-N-methyl-N-acetoxyamide are reacted with 19.8 parts of the sodium salt of dimethyldithiophosphoric acid in 30 parts of water and 5 parts by volume of acetone by being stirred for 16 hours at room temperature. There are obtained 24.9 parts of a compound of the formula

$$(CH_3O)_2\overset{S}{\underset{\|}{P}}-SCH_2CO\underset{|}{\overset{CH_3}{N}}-OCOCH_3$$

Analysis.—Calculated: P, 10.78%. Found: P, 10.81%.

(b) As described in Example 8, 16.55 parts of chloroacetic acid-N-methyl-N-acetoxyamide are reacted with 22.08 parts of the sodium salt of diethyldithiophosphoric acid in 30 parts of water and 5 parts by volume of acetone by being stirred for 16 hours at room temperature. There are obtained 29.4 parts of the compound of the formula

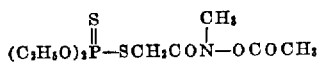

$$(C_2H_5O)_2\overset{S}{\underset{\|}{P}}-SCH_2CO\underset{|}{\overset{CH_3}{N}}-OCOCH_3$$

Analysis.—Calculated: P, 9.82%. Found: P, 9.73%.

EXAMPLE 11

A mixture of 13.75 parts of chloroacetic acid-O:N-dimethylhydroxylamide and 30.8 parts of the potassium salt of bismethoxy-ethyldithiophosphoric acid are stirred for 4 hours at the boil in the two-phase system water (120 parts by volume):methylene chloride (40 parts by volume). Working up as described in Example 8 yields 29.0 parts of a compound of the formula

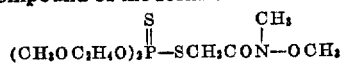

$$(CH_3OC_2H_4O)_2\overset{S}{\underset{\|}{P}}-SCH_2CO\underset{|}{\overset{CH_3}{N}}-OCH_3$$

Analysis.—Calculated: P, 8.92%. Found: P, 8.42%.

EXAMPLE 12

2 parts each of the condensation products of Examples 1 to 11 are mixed with 1 part of the condensation product from 1 molecular proportion of tertiary octylphenol and 8 molecular proportions of ethylene oxide and 7 parts of isopropanol. The resulting clear solution can be used as a liquid spray concentrate which can be emulsified by being poured into water.

(A) To determine the contact effect of this product on aphids the following experiment was conducted with the use of liquid sprays containing respectively 0.08%, 0.04%, 0.02%, and 0.01% of active principle.

Broad beans which were strongly infested with aphids were sprayed all over and after 48 hours the effect achieved was determined. When a 100% effect was observed, the plants were infested with fresh aphids and the effect again checked after another 48 hours. The results so obtained are summarized in the following Tables II and III.

For each plant an identifying mark was used:

+ signifies that no live aphids were left;
− signifies insufficient or no effect;
/ signifies good effect, only few live aphids left.

Table II

| Conc. of active subst. in spray liquid, percent | Ex. 1 | Ex. 2 | Ex. 3 | Ex. 4(a) | Ex. 7 | Ex. 8(a) | Ex. 8(b) Table I Comp. No. 1 | Ex. 8(b) Table I Comp. No. 3 | Ex. 8(b) Table I Comp. No. 4 | Ex. 9(a) | Ex. 9(b) |
|---|---|---|---|---|---|---|---|---|---|---|---|
| 0.08 | + + | + + | + + | + + | + + | + + | + + | + + | + + | + + | + + |
| 0.04 | + + | + + | + + | + + | + + | + + | + + | + + | + + | + + | + + |
| 0.02 | + + | + + | + + | + + | + + | + + | + + | + + | − − | + + | + + |
| 0.01 | + + | + + | + + | + + | + / | / − | − − | − − | − − | + + | + + |

Table III

Effect on aphids 48 hours after reinfestation

| Conc. of active principle in spray liquid, percent | Ex. 1 | Ex. 2 | Ex. 3 | Ex. 4(a) | Ex. 7 | Ex. 8(a) | Ex. 8(b) Table I Comp. No. 1 | Ex. 8(b) Table I Comp. No 3 | Ex. 8(b) Table I Comp. No 4 | Ex. 9(a) | Ex. 9(b) |
|---|---|---|---|---|---|---|---|---|---|---|---|
| 0.08 | + + | + + | + + | + + | + + | / / | + + | + + | + + | + + | + + |
| 0.04 | + / | − − | + + | + + | − − | / / | / / | + + | − − | + + | + + |
| 0.02 | / / | + / | + / | − − | − − | − − | / / | + + | − − | + + | + + |
| 0.01 | / − | − − | − − | − − | − − | − − | − − | − − | − − | + + | / / |

(B) To determine the effect on aphids by diffusion through the leaves the following experiment was conducted with the use of liquid sprays containing respectively 0.08%, 0.04%, 0.02% and 0.01% of active principle.

Of the broad beans which were infested with aphids only on the underside of the leaves, only the upper surface of the leaves was sprayed with the liquid sprays described above and after 48 hours the effect on the underside of the leaves was inspected. The results obtained are summarized in the following Table IV:

Table IV

| Concentr. of active principle in spray liquid, percent | Effect on aphids by diffusion | | | | | | | |
|---|---|---|---|---|---|---|---|---|
| | Ex. 1 | Ex. 2 | Ex. 8(b) Table I comp. No 7 | Ex. 8(b) Table I comp. No 10 | Ex. 9(a) | Ex. 9(b) | Ex. 9(c) | Ex. 9(d) |
| 0.08 | ++++ | ++++ | ++++ | ++++ | ++++ | ++++ | ++++ | ++++ |
| 0.04 | ++++ | ++++ | ++++ | ++++ | ++++ | ++++ | //// | ++++ |
| 0.02 | ++++ | ++++ | −−−− | +++/ | ++++ | ++++ | // −− | / −−− |
| 0.01 | ++−− | ++++ | −−−− | −++/ | ++++ | ++++ | // −− | −−−− |

To determine the acaricidal effect on the red spider mite Tetranychus urticae liquid sprays of the composition specified in this example were used, each spray containing 0.04% of the compounds mentioned in the following Table V.

Test method.—Broad beans strongly infested with red spinner mites were sprayed all over with the liquid spray concerned and the effect was determined in the following manner:

Check a: (after 48 hours) to determine the acaricidal effect.

Check b: (after another 5 days) to determine the permanent acaricidal effect and/or the ovicidal effect.

The results are shown in the following Table V:

Table V

| Compound | Effect on red spider mite | |
|---|---|---|
| | Check a | Check b |
| Example 3 | + | + |
| Example 4(a) | / | + |
| Example 4(b) | + | + |
| Example 7 | / | + |
| Example 8(a) | + | + |
| Ex. 8(b) Table I, Comp. 1 | + | + |
| Ex. 8(b) Table I, Comp. 2 | + | + |
| Ex. 8(b) Table I, Comp. 3 | + | + |
| Ex. 8(b) Table I, Comp. 4 | + | + |
| Ex. 8(b) Table I, Comp. 5 | / | / |
| Ex. 8(b) Table I, Comp. 8 | + | + |
| Ex. 8(b) Table I, Comp. 9 | + | + |
| Ex. 8(b) Table I, Comp. 11 | + | / |
| Ex. 8(b) Table I, Comp. 12 | / | + |
| Example 11 | / | / |

NOTE.— + signifies: All red spider mites destroyed. / signifies: Good acaricidal effect; only few spider mites left alive.

The compounds of Examples 1 to 11 further have a good to very good stomach poison effect on *Musca domestica, Carausius morosus, Orgyia gonostigma* and *Gastroidea viridula*.

To manufacture liquid spray concentrates there may also be used wetting and emulsifying agents other than those mentioned above. There may be used non-ionic products, for example condensation products of aliphatic alcohols, amines or carboxylic acids containing a long-chain hydrocarbon radical of about 10 to 30 carbon atoms with ethylene oxide, such as the condensation product from: Octadecyl alcohol with 25 to 30 mols of ethylene oxide, or soybean fatty acid with 30 mols of ethylene oxide, or commercial oleylamine with 15 mols of ethylene oxide, or dodecylmercaptan with 12 mols of ethylene oxide.

As suitable anionic emulsifiers there may be mentioned: the sodium salt of dodecyl alcohol sulfuric acid ester, the sodium salt of dodecylbenzenesulfonic acid, the potassium or triethanolamine salt of oleic or abietic acid or of mixtures of these acids, and the sodium salt of a petroleum-sulfonic acid.

Instead of with isopropanol the liquid spray concentrates may be prepared with other solvents, for example ethanol, methanol, butanol, acetone, methylethyl ketone, methyl-cyclohexanol, benzene, toluene, xylene, kerosenes, or petroleum fractions. Likewise suitable are mixtures of different solvents.

EXAMPLE 13

2 parts each of the condensation products of Examples 1 to 11 are mixed with 9 parts of chalk and 1 part of wetting agent. A dusting powder is obtained from which liquid sprays can be prepared by suspension in water. When the walls of stables are treated with such a spray containing 0.04% of active principle, good effects against flies and midges are obtained.

What is claimed is:

1. An organic phosphorus compound of the formula

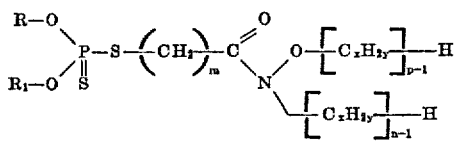

in which R and $R_1$ each represents an alkyl radical containing at most 4 carbon atoms, $m$, $n$ and $p$ each represents a whole number of at the most 2, and $x$ and $y$ each represents a whole number of at the most 4.

2. An organic phosphorus compound of the formula

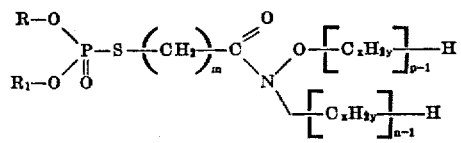

in which R and $R_1$ each represents an alkyl radical containing at most 4 carbon atoms, $m$, $n$ and $p$ each represents a whole number of at the most 2, and $x$ and $y$ each represents a whole number of at the most 4.

3. An organic phosphorus compound of the formula

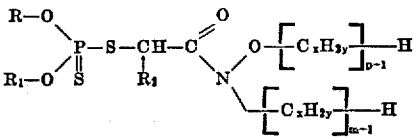

in which R, $R_1$ and $R_2$ each represents an alkyl radical containing at most 4 carbon atoms and $m$ and $p$ each represents a whole number of at the most 2, and $x$ and $y$ each represents a whole number of at the most 4.

4. An organic phosphorus compound of the formula

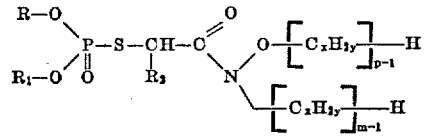

in which R, $R_1$ and $R_2$ each represents an alkyl radical containing at most 4 carbon atoms and $m$ and $p$ each represents a whole number of at the most 2, and $x$ and $y$ each represents a whole number of at the most 4.

5. An organic phosphorus compound of the formula

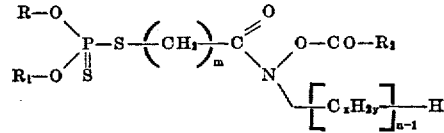

in which R, $R_1$ and $R_2$ each represents an alkyl radical containing at most 4 carbon atoms and $m$ and $n$ each represents a whole number of at the most 2 and $x$ and $y$ each represents a whole number of at the most 4.

6. An organic phosphorus compound of the formula

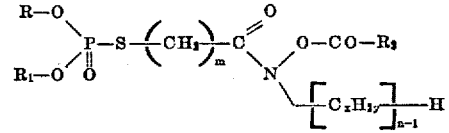

in which R, $R_1$ and $R_2$ each represents an alkyl radical containing at most 4 carbon atoms and $m$ and $n$ each represents a whole number of at the most 2 and $x$ and $y$ each represents a whole number of at the most 4.

7. An organic phosphorus compound of the formula

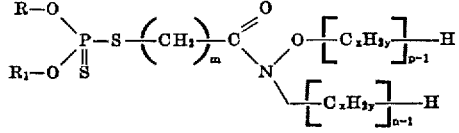

in which R represents an alkyl radical containing at most 4 carbon atoms, $R_1$ represents a cyclohexyl radical, and $m$, $n$ and $p$ each represents a whole number of at the most 2 and $x$ and $y$ each represents a whole number of at the most 4.

8. An organic phosphorus compound of the formula

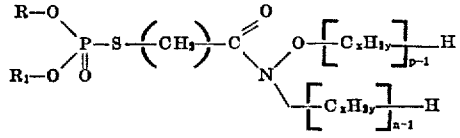

in which R represents an alkyl radical containing at most 4 carbon atoms, $R_1$ represents a cyclohexyl radical, and m, n and p each represents a whole number of at the most 2 and x and y each represents a whole number of at the most 4.

9. The compound of the formula

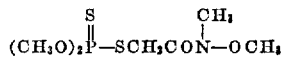
$$(CH_3O)_2\overset{S}{\overset{\|}{P}}-SCH_2CO\overset{CH_3}{\overset{|}{N}}-OCH_3$$

10. The compound of the formula

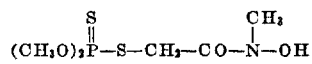
$$(CH_3O)_2\overset{S}{\overset{\|}{P}}-S-CH_2-CO-\overset{CH_3}{\overset{|}{N}}-OH$$

11. The compound of the formula

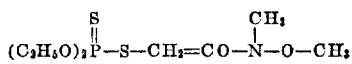
$$(C_2H_5O)_2\overset{S}{\overset{\|}{P}}-S-CH_2=CO-\overset{CH_3}{\overset{|}{N}}-O-CH_3$$

12. The compound of the formula

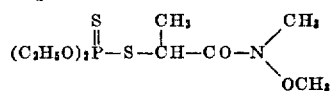
$$(C_2H_5O)_2\overset{S}{\overset{\|}{P}}-S-\overset{CH_3}{\overset{|}{CH}}-CO-N\diagdown_{OCH_3}^{CH_3}$$

13. The compound of the formula

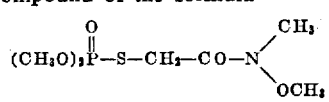
$$(CH_3O)_2\overset{O}{\overset{\|}{P}}-S-CH_2-CO-N\diagdown_{OCH_3}^{CH_3}$$

14. The compound of the formula

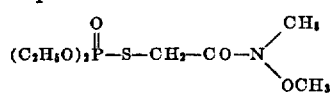
$$(C_2H_5O)_2\overset{O}{\overset{\|}{P}}-S-CH_2-CO-N\diagdown_{OCH_3}^{CH_3}$$

15. An organic phosphorus compound of the formula

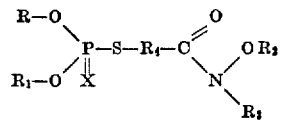

in which R and $R_1$ each represents a member selected from the group consisting of an alkyl radical containing at most 18 carbon atoms, a lower alkoxy lower alkyl radical and a cyclohexyl radical, $R_2$ represents a member selected from the group consisting of a hydrogen atom, an alkyl radical containing at most 4 carbon atoms and a radical of the formula

wherein $R_5$ represents an alkyl radical containing at most 4 carbon atoms, $R_3$ represents a member selected from the group consisting of a hydrogen atom and an alkyl radical containing at most 4 carbon atoms, $R_4$ represents a member selected from the group consisting of the group —$CH_2$—, the group —$CH_2$—$CH_2$— and the group

in which $R_6$ represents an alkyl radical containing at most 4 carbon atoms, and X represents a member selected from the group consisting of an oxygen atom and a sulfur atom.

16. A preparation for combating pests which comprises an organic phosphorus compound of the formula

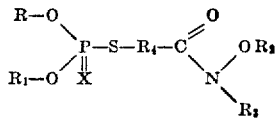

in which R, $R_1$ to $R_5$ and X have the meanings given in claim 15, in admixture with a member selected from the group consisting of a pesticidally inactive carrier, a dispersing agent, a wetting agent, a herbicide and another pesticide.

17. The method of controlling pests on materials that are subject to attack by pests, which comprises applying to said materials a pesticidal amount of an organic phosphorus compound of the formula

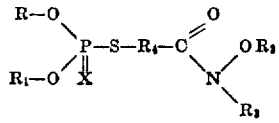

in which R, $R_1$ to $R_5$ and X have the meanings given in claim 15.

References Cited in the file of this patent

UNITED STATES PATENTS 2,959,608    Crouch et al.   ----------- Nov. 8, 1960

FOREIGN PATENTS 663,270    Great Britain   ---------- Dec. 19, 1951
791,824    Great Britain   ---------- Mar. 12, 1958

UNITED STATES PATENT OFFICE
CERTIFICATE OF CORRECTION

Patent No. 3,092,541            June 4, 1963

Ernst Beriger

It is hereby certified that error appears in the above numbered patent requiring correction and that the said Letters Patent should read as corrected below.

Column 10, lines 70 to 75, the formula should appear as shown below instead of as in the patent:

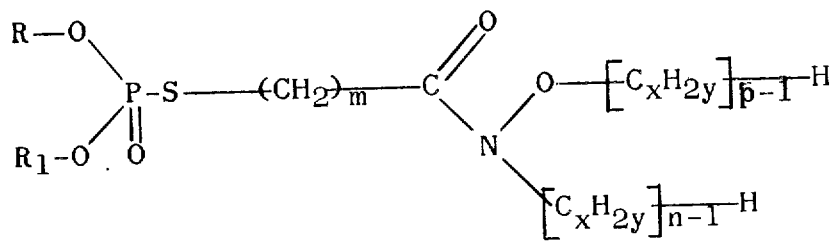

column 11, lines 15 and 16, the formula should appear as shown below instead of as in the patent:

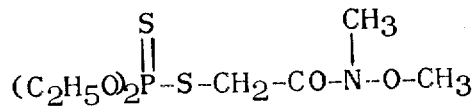

Signed and sealed this 26th day of May 1964.

(SEAL)
Attest:

ERNEST W. SWIDER
Attesting Officer

EDWARD J. BRENNER
Commissioner of Patents